United States Patent
Kim

(10) Patent No.: US 10,750,348 B2
(45) Date of Patent: Aug. 18, 2020

(54) COMMUNICATION DEVICE AND COMMUNICATION METHOD

(71) Applicant: SAMSUNG ELECTRONICS CO., LTD., Suwon-si, Gyeonggi-do (KR)

(72) Inventor: Bo-ram Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 61 days.

(21) Appl. No.: 15/676,059

(22) Filed: Aug. 14, 2017

(65) Prior Publication Data

US 2018/0063695 A1 Mar. 1, 2018

(30) Foreign Application Priority Data

Aug. 30, 2016 (KR) .................. 10-2016-0110837

(51) Int. Cl.
*H04L 12/12* (2006.01)
*H04W 8/00* (2009.01)
*H04W 4/80* (2018.01)
*H04M 1/725* (2006.01)
*G06F 3/0482* (2013.01)

(52) U.S. Cl.
CPC ............ *H04W 8/005* (2013.01); *H04L 12/12* (2013.01); *H04M 1/7253* (2013.01); *H04W 4/80* (2018.02); *G06F 3/0482* (2013.01); *Y02D 50/40* (2018.01)

(58) Field of Classification Search
CPC ..... H04L 12/12; H04L 12/282; H04L 12/185; H04W 4/80; H04W 84/12
See application file for complete search history.

(56) References Cited

U.S. PATENT DOCUMENTS

| 8,214,863 | B2 | 7/2012 | Kim et al. | |
| 9,426,606 | B2* | 8/2016 | Lee | H04W 8/08 |
| 2004/0162027 | A1* | 8/2004 | Chang | H04M 1/7253 455/41.2 |
| 2005/0034160 | A1* | 2/2005 | Kim | H04L 12/2805 725/80 |
| 2008/0113618 | A1* | 5/2008 | De Leon | H04M 1/7253 455/41.2 |
| 2009/0195402 | A1* | 8/2009 | Izadi | H04W 76/14 340/686.6 |
| 2012/0137346 | A1* | 5/2012 | Lee | G06F 21/606 726/4 |

(Continued)

FOREIGN PATENT DOCUMENTS

| EP | 1 684 466 | 7/2006 |
| EP | 2 733 888 | 5/2014 |
| KR | 10-0587539 | 6/2006 |

OTHER PUBLICATIONS

John Wink, Windows 10—Audio Troubleshooting Tips, Jul. 30, 2015, Media Technology Blog, pp. 1-11 (Year: 2015).*

(Continued)

*Primary Examiner* — Justin S Lee
(74) *Attorney, Agent, or Firm* — Nixon & Vanderhye P.C.

(57) ABSTRACT

A communication device and a communication method are provided. The communication device is configured to search for an external device that may be connected to the communication device before the communication device is connected to the external device and transmits and receives data.

11 Claims, 13 Drawing Sheets

(56) References Cited

U.S. PATENT DOCUMENTS

| | | | | |
|---|---|---|---|---|
| 2012/0198098 A1* | 8/2012 | Kim | ............... | H04L 67/16 710/8 |
| 2013/0024706 A1* | 1/2013 | Katar | ............... | H04L 12/12 713/321 |
| 2013/0303205 A1* | 11/2013 | Boylan | ............... | H04W 4/70 455/466 |
| 2014/0045430 A1* | 2/2014 | Kim | ............... | H04B 7/26 455/41.2 |
| 2014/0173108 A1* | 6/2014 | Lee | ............... | H04L 12/12 709/224 |
| 2014/0229184 A1* | 8/2014 | Shires | ............... | H04L 12/12 704/275 |
| 2014/0373123 A1* | 12/2014 | Kang | ............... | H04L 41/22 726/7 |
| 2015/0052443 A1* | 2/2015 | Funase | ............... | G06F 3/0484 715/736 |
| 2015/0087235 A1* | 3/2015 | Wang | ............... | H04W 4/80 455/41.2 |
| 2015/0301766 A1* | 10/2015 | Poirier | ............... | G06F 3/1204 358/1.15 |
| 2016/0080475 A1* | 3/2016 | Singh | ............... | H04L 67/10 709/217 |
| 2017/0012821 A1* | 1/2017 | Sa | ............... | G06F 1/1632 |
| 2017/0201854 A1* | 7/2017 | Choi | ............... | H04W 72/0406 |
| 2017/0357434 A1* | 12/2017 | Coffman | ............... | G06F 3/0482 |
| 2018/0139265 A1* | 5/2018 | Shah | ............... | H04L 67/04 |

OTHER PUBLICATIONS

Extended Search Report dated Nov. 14, 2017 in counterpart European Patent Application No. 17187308.6.

* cited by examiner

COMMUNICATION DEVICE AND COMMUNICATION METHOD

CROSS-REFERENCE TO RELATED APPLICATION

This application is based on and claims priority under 35 U.S.C. § 119 to Korean Patent Application No. 10-2016-0110837, filed on Aug. 30, 2016, in the Korean Intellectual Property Office, the disclosure of which is incorporated by reference herein in its entirety.

BACKGROUND

1. Field

The present disclosure relates generally to communication devices and communication methods, and for example, to a communication device and a communication method that search for a connectable external device.

2. Description of Related Art

A communication device and an external device may be connected using various communication methods. For example, the communication device and the external device may be connected using a communication protocol such as Wi-Fi, Bluetooth, and the like.

Also, as communications technology has developed, external devices that may be connected to one communication device have become more diversified. Accordingly, there is a need for a process of searching for an external device that may be connected to the communication device before the communication device is connected to the external device and transmits and receives data.

SUMMARY

According to an aspect of an example embodiment, a communication device includes a communicator comprising communication circuitry; a display; and a processor configured to: transmit a discovery message to search for an external device, control the communicator to receive a response message comprising information indicating whether there is a function of identifying the external device from one or more external devices that received the discovery message, control the display to display a user interface comprising a list of the one or more external devices that transmitted the response message, receive an input that selects one external device having the function of identifying the external device from the list using the user interface, and control the communicator to transmit, to the selected external device, a feedback request message to control the selected external device to perform an operation of identifying the external device to indicate that the selected external device is a device selected based on the input.

According to an aspect of another example embodiment, the response message includes information indicating at least one of: whether the function of identifying the external device is provided and ON/OFF states of the function of identifying the external device.

The processor may generate a list of the one or more external devices that transmitted the response message based on the received response message, and may control the display to display the generated list and display differently an external device that may use the function of identifying the external device among the one or more external devices that transmitted the response message.

The processor may control the display to display a user interface for selecting the external device when it is determined through the response message that the external device provides the function of identifying the external device and that the function of identifying the external device is set to an ON state.

The operation of identifying the external device includes at least one of operations of: blinking a light emitting diode (LED), outputting sound, outputting a notification screen, and vibrating.

The processor may control the communicator to perform pairing with the external device when it is determined that the external device that received the feedback request message performs the operation of identifying the external device to indicate that the external device is the selected device.

The discovery message may be transmitted through one protocol from among a multicast domain name service (mDNS), a simple service discovery protocol (SSDP), Wi-Fi, and Bluetooth.

The information indicating whether the external device may provide the function of identifying the external device is included in an extension field of a data packet constituting the response message.

According to an aspect of another example embodiment, a communication method includes transmitting a discovery message for searching for an external device; receiving, from one more external devices that received the discovery message, a response message comprising information indicating whether the one more external devices provide a function of identifying the external device; displaying a user interface comprising a list of the one or more external devices that transmitted the response message; receiving an input that selects one external device providing the function of identifying the external device from the list, using the user interface; and transmitting, to the selected external device, a feedback request message which controls the selected external device to perform an operation of identifying the external device to indicate that the selected external device is a device selected based on the input.

The response message includes information indicating at least one of: whether the function of identifying the external device is provided and ON/OFF states of the function of identifying the external device.

The displaying of the user interface includes: generating a list of the one or more external devices that transmitted the response message, based on the received response message; and displaying the generated list and displaying differently an external device that may use the function of identifying the external device from among the one or more external devices that transmitted the response message.

The displaying of the user interface includes: displaying a user interface for selecting the external device when it is determined through the response message that the external device provides the function of identifying the external device and that the function of identifying the external device is set to an ON state.

The operation of identifying the external device includes at least one of operations of: blinking an LED, outputting sound, outputting a notification screen, and vibrating.

The communication method may further include: performing pairing with the external device when it is determined that the external device that received the feedback request message performs the operation of identifying the external device to indicate that the external device is the selected device.

The discovery message may be transmitted through one protocol from among a multicast domain name service (mDNS), a simple service discovery protocol (SSDP), Wi-Fi, and Bluetooth.

The information indicating whether the external device provides the function of identifying the external device may be included in an extension field of a data packet constituting the response message.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1:
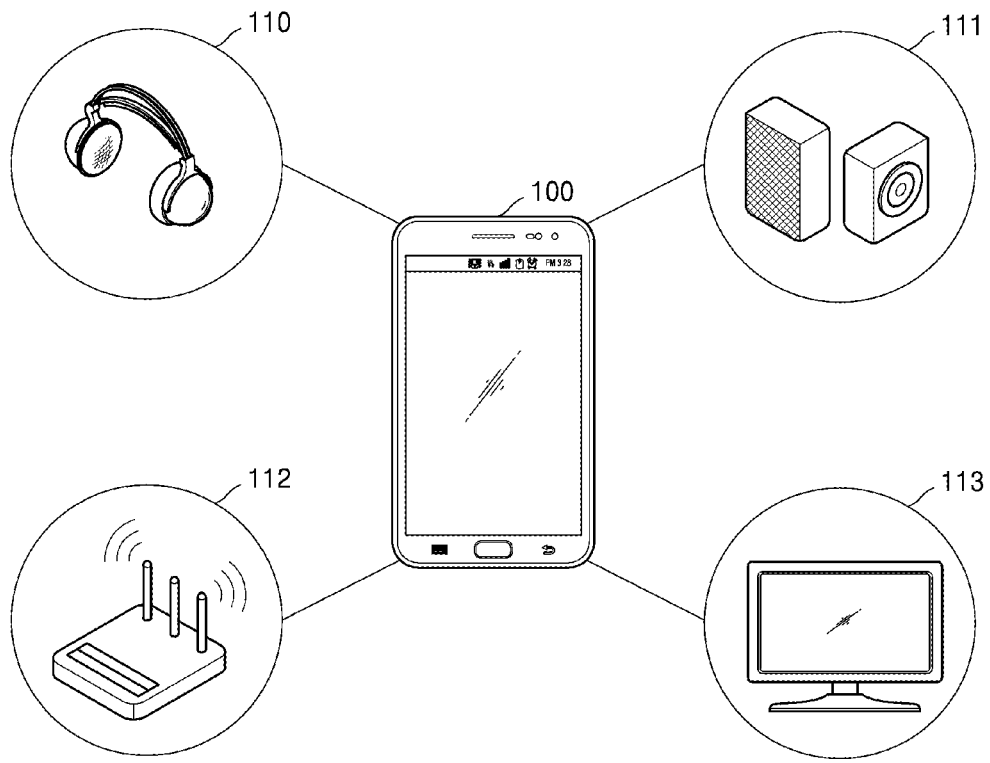
FIG. 1 is a diagram illustrating an example communication device according to an example embodiment.

FIG. 1 is a diagram illustrating an example communication device 100 according to an example embodiment.

Referring to FIG. 1, the communication device 100 may be connected to various external devices through a network. For example, and without limitation, the communication device 100 may be connected to various external devices such as a Bluetooth headset 110, a Bluetooth speaker 111, a Wi-Fi router 112, or a TV 113.

The communication device 100 may search for an external device connectable to the communication device 100 before performing pairing with the external device. When an input, e.g., a user input, for selecting one external device to be connected from one or more found external devices is received, the communication device 100 may perform pairing with the selected external device. However, if the number of the found external devices is large or names of a plurality of external devices are set to be similar to each other, it may be difficult for the user to know which of the found external devices is to be connected.

For example, if there are three Bluetooth headsets that may be connected to the communication device 100 around or in an operable vicinity of the communication device 100, the communication device 100 may display a list including the three Bluetooth headsets that are found. The list may display the three Bluetooth headsets by a name of each device. However, it may be difficult for the user to know which Bluetooth headset to connect to the communication device 100 only by the name of the Bluetooth headset.

The communication device 100 may perform a pairing with one Bluetooth headset selected from the list. Then, if it is determined that the paired Bluetooth headset is not the Bluetooth headset to be connected, the communication device 100 may receive an input, e.g., a user input, to select another Bluetooth headset from the list. The communication device 100 may then perform pairing with the other selected Bluetooth headset. However, an operation of performing pairing with the external device may take a relatively long time. Therefore, it is desirable to provide a method by which the user may easily confirm an external device to be connected to the communication device 100 before the communication device 100 and the external device are paired.

In addition, among the external devices connectable to the communication device 100, there may be an external device being used by another person. In this case, in order not to disturb the other person, it is necessary to set the external device being used by the other person resulting in the user not being able to confirm whether or not the external device being used by the other person is an external device to be connected to the communication device 100.

Figure 2:
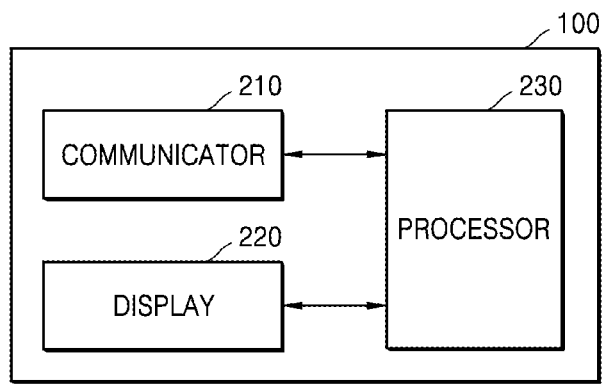
FIG. 2 is a block diagram illustrating an example configuration of a communication device according to an example embodiment.

FIG. 2 is a block diagram illustrating an example configuration of the communication device 100 according to an example embodiment.

The communication device 100 illustrated in FIG. 2 may be an example embodiment of the communication device 100 illustrated in FIG. 1.

Referring to FIG. 2, the communication device 100 according to an embodiment may include a communicator (e.g., including communication circuitry) 210, a display 220, and a processor (e.g., including processing circuitry) 230. However, the communication device 100 may be implemented by more components than the illustrated elements and is not limited to the above-described example.

Hereinafter, the components will be described in greater detail.

The communicator 210 according to an embodiment may include various communication circuitry to transmit a discovery message for searching for an external device. For example, the communicator 210 may include circuitry configured to transmit the discovery message using a discovery protocol such as a multicast Domain Name System (mDNS) or a Simple Service Discovery Protocol (SSDP). The discovery protocol refers to a protocol used to search for devices connected on the same network. Alternatively, according to an embodiment, the communicator 210 may broadcast the discovery message using a wireless communication method such as Wi-Fi or Bluetooth.

The communicator 210 may receive a response message including information indicating whether or not there is a function of identifying an external device from one or more external devices that have received the discovery message.

The function of identifying the external device may refer, for example, to a function of identifying an external device selected according to a user input from among one or more external devices connectable to the communication device 100. Hereinafter, for convenience of explanation, the function for identifying the external device will be referred to as a "device identification function". For example, when names of two external devices are set to be similar to each other, it is difficult for the user to identify the external device to be connected among the two external devices by using the name of the external device. Thus, using the device identification function, the user may confirm in advance which external device to connect to the communication device 100 before performing pairing with the external device.

The response message may include information indicating whether the external device has a profile and a device identification function. For example, the profile of the external device may include information such as a name of the external device, a universal unique identifier (UUID), an Internet Protocol (IP) address, time to live (TTL), etc. The UUID may mean a unique identifier that may distinguish each external device. For example, a media access control (MAC) address or an IP address of each external device may be set as a UUID of each external device. However, the UUID may vary depending on an embodiment and is not limited to the above-described example. TTL is information indicating a time when a response message transmitted by an external device is valid.

The display 220 according to an embodiment may display a user interface including a list of one or more external devices that transmitted the response message. The user interface displayed on the display 220 may include a user interface required for the user to use the device identification function. For example, the display 220 may display differently an external device that may use the device identification function among the one or more external devices that transmitted the response message. Thus, the user may easily know the external device that may use the device identification function. The user interface may include a user interface for selecting the external device that may use the device identification function.

When the display 220 is implemented as a touch screen, the display 220 may be used as an input device in addition to an output device. The display 220 may include at least one of a liquid crystal display (LCD), a thin film transistor-liquid crystal display (TFT-LCD), an organic light-emitting diode (OLED), a flexible display, a three-dimensional (3D) display, and an electrophoretic display, or the like, but is not limited thereto. According to an implementation of the communication device 100, the communication device 100 may include two or more displays 220.

The processor 230 according to an embodiment may include various processing circuitry to control the overall components of the communication device 100 including the communicator 210 and the display 220. The processor 230 may control the communicator 210 to send a discovery message to search for an external device and to receive a response message including the information indicating whether to have the device identification information from the one or more external devices that received the discovery message. The processor 230 then may control the display 220 to display a user interface including a list of the one or more external devices that transmitted the response message.

The processor 230 may receive a user input to select one external device having the device identification function from the list, via the user interface. As described above, the display 220 may display differently the external devices that may use the device identification function among the one or more external devices that transmitted the response message. Accordingly, the processor 230 may receive an input to select an external device that the user intends to identify from the one or more external devices that have used the device identification function.

Also, the processor 230 may control the communicator 210 to transmit a feedback request message which controls the selected external device to perform an operation of identifying the external device to indicate that the selected external device is a device selected based on the user input.

The feedback request message may refer, for example, to a message for controlling the external device to perform an operation indicating that the device is selected based on the user input.

When one external device is selected from among one or more external devices and the feedback request message is transmitted to the selected external device, the external device that received the feedback request message may indicate that the device is selected by performing a predetermined operation. For example, when the selected device according to a user input is a Bluetooth headset, it may be indicated that the Bluetooth headset is the selected device by performing an operation of blinking an LED attached to the Bluetooth headset. As another example, when the selected device is a speaker, it may be indicated that the speaker is the selected device by outputting a predetermined sound (e.g., a beep sound). Alternatively, when the selected device is a TV, it may be indicated that the TV is the selected device by performing at least one of operations of blinking a LED, outputting sound, and displaying a notification screen. However, the operation performed to indicate that the external device is the selected device may vary according to an embodiment and is not limited to the above-described example.

Figure 3:
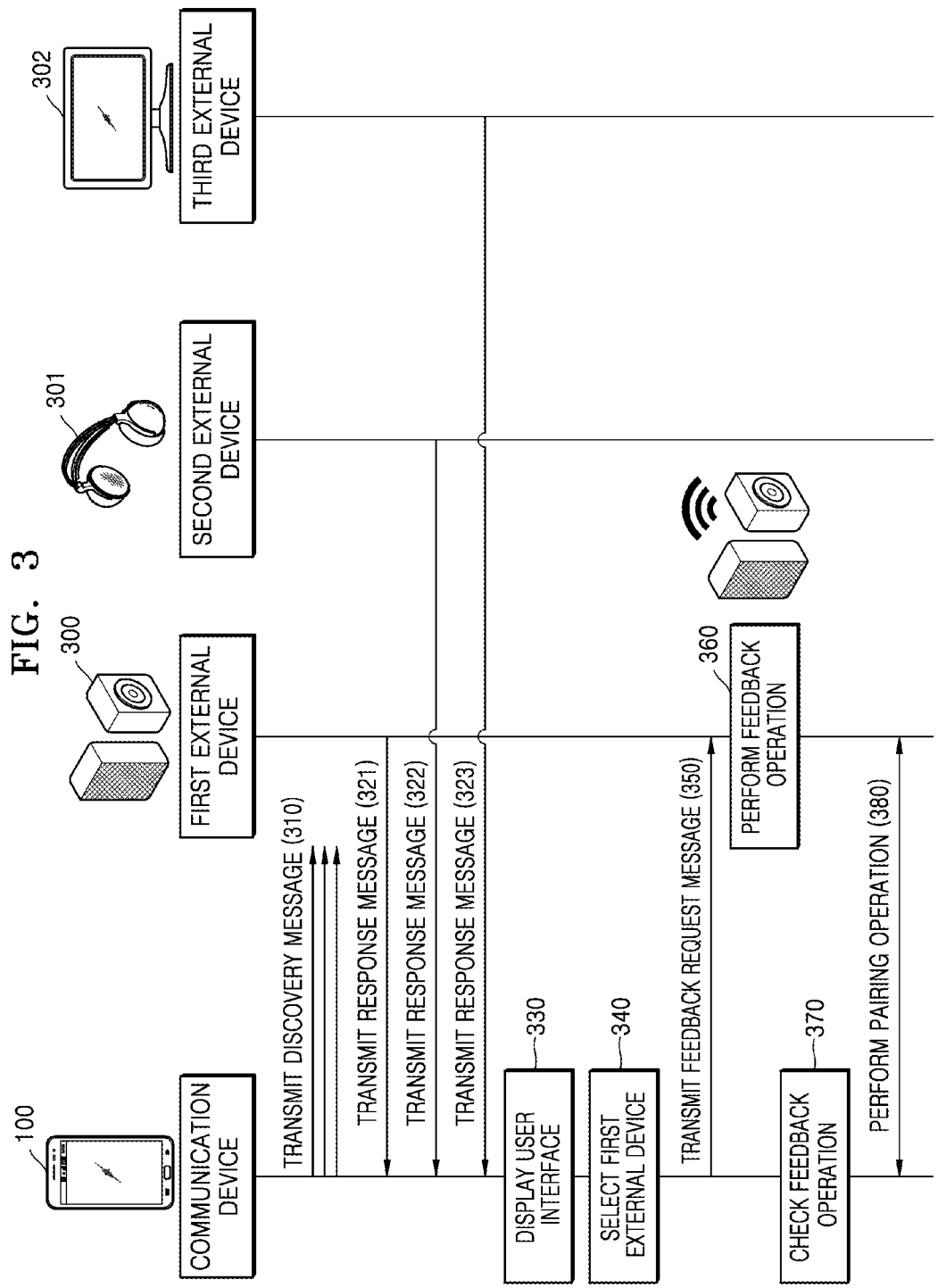
FIG. 3 is a flowchart illustrating an example communication method according to an example embodiment.

FIG. 3 is a flowchart illustrating an example communication method according to an example embodiment.

Referring to FIG. 3, the communication device 100 may transmit (310) a discovery message to search for an external device connectable to the communication device 100. For example, the communication device 100 may transmit the discovery message using an mDNS and an SSDP protocol used to search for the external device over a local network. As another example, the communication device 100 may broadcast the discovery message using Wi-Fi or Bluetooth.

First through third external devices 300, 301, and 302 receiving the discovery message may transmit (321, 322, and 323) response messages to the communication device 100, respectively. The response message transmitted by each external device may include a profile of each external device and information indicating whether each external device has a device identification function. For example, the information indicating whether or not the device has the device identification function may include information indicating at least one of whether the device identification function is provided and an ON/OFF state of the device identification function.

The communication device 100 may generate a list including the first through third external devices 300, 301, and 302 based on response messages received from the first through third external devices 300, 301, and 302. Then, the communication device 100 may display (330) a user interface including the generated list.

A user may use the device identification function through the user interface including the generated list. For example, the user may select (340) through the user interface one external device that may use the device identification function. For example, referring to FIG. 3, the first through third external devices 300, 301, and 302 may all provide a function of identifying an external device. However, when the communication device 100 transmits the discovery message, the device identification function of the first external device 300 and the second external device 301 may be set to the ON state, and the device identification function of the third external device 302 may be set to the OFF state. For example, the third external device 302 may be a device in use by another person. In this case, the device identification function of the third external device 302 may be set to the OFF state. Then, since the device identification function may not be used for the third external device 302, the user may select one of the first external device 300 or the second external device 301 from the list. Accordingly, the communication device 100 may prevent the user from using the device identification function for the external device being used by the other person, thereby preventing the other device from interfering with the other person.

When the user selects (340) the first external device 300, the communication device 100 may transmit (350) a feedback request message to the first external device 300 which controls performance of an operation indicating that the first external device 300 is the selected device. Upon receiving the feedback request message, the first external device 300 may perform an operation 360 in which the user may identify the first external device 300. For example, as illustrated in FIG. 3, when the first external device 300 is a speaker, the first external device 300 may output a predetermined sound. Accordingly, the user may easily know which device is the first external device 300 by checking (370) the speaker on which the sound is output.

The operation indicating that the first external device 300 is the selected device may vary depending on a type of an external device. The external device selected by the user may perform an operation indicating that the external device is selected according to a function provided by the external device. For example, when the external device is a speaker, the speaker may output a sound. When the external device is a mobile phone, the mobile phone may perform operations such as blinking a LED, outputting sound, displaying a notification screen, and vibrating. Accordingly, the user may easily check which device is the first external device 300 selected by the user from among a plurality of external devices.

When it is determined that the first external device 300 performing the operation indicating that the first external device 300 is the selected is the device that the user wants to be connected to the communication device 100, the communication device 100 may perform (380) pairing with the first external device 300.

When there are a plurality of external devices that may be connected to the communication device 100, it is difficult for the user to know what external device is to be connected to the communication device 100 only by a name of the external device. For example, all of the plurality of external devices are mobile phones of the same type, and names of the plurality of external devices may be all set to "smartphone". In this case, it is difficult for the user to identify the external device to be connected to the communication device 100 only by the name of the external device displayed on a display of the communication device 100. Thus, by using a device identification function, the user may confirm in advance an external device to be connected to the communication device 100 before the communication device 100 and the external device are paired.

Figure 4:
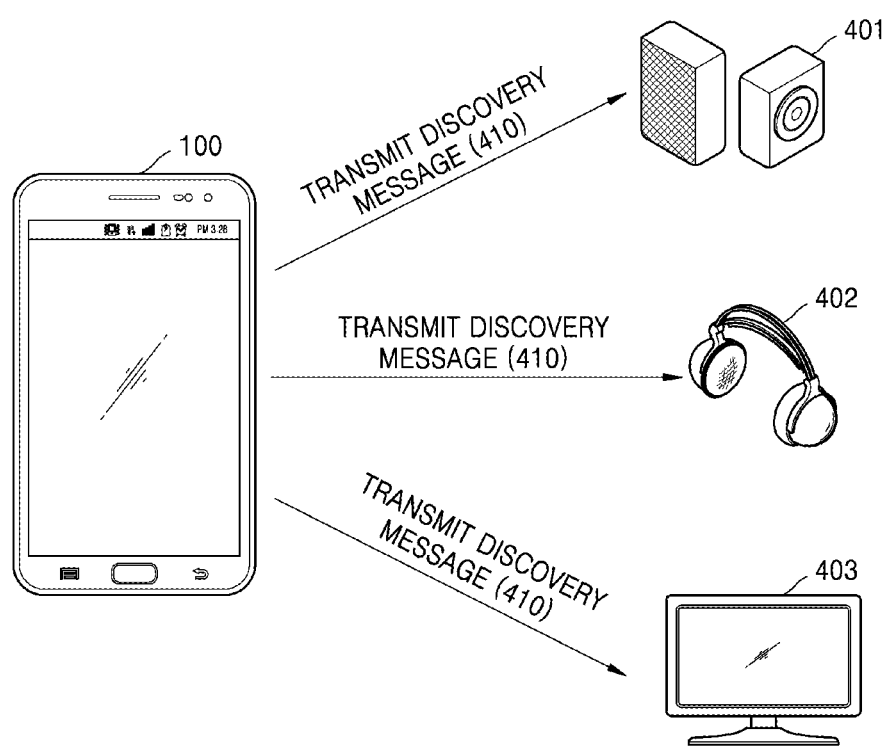
FIG. 4 is a diagram illustrating an example process of transmitting a discovery message according to an example embodiment.

FIG. 4 is a diagram illustrating an example process of transmitting a discovery message according to an embodiment.

Referring to FIG. 4, the communication device 100 may transmit (410) a discovery message to search for external devices 401, 402, and 403 connectable to the communication device 100.

When transmitting the discovery message, the communication device 100 may use the discovery protocol such as an mDN or a SSDP. As described above, the discovery protocol refers to a protocol used for searching for devices connected through a local network.

When the communication device 100 transmits the discovery message using the mDNS protocol, the discovery message may be transmitted in form of a DNS packet. According to an embodiment, when the communication device 100 transmits the discovery message using the SSDP protocol, the discovery message may be transmitted in a form of an HTTP packet. Packet types of the mDNS and SSDP protocols are well known to those of ordinary skill in the art, and detailed descriptions thereof will be omitted here.

Further, according to an embodiment, the communication device 100 may transmit the discovery message using a communication protocol such as Wi-Fi or Bluetooth. When the communication device 100 transmits the discovery message using Wi-Fi or Bluetooth, the communication device 100 may broadcast the discovery message. For example, when transmitting the discovery message using Wi-Fi, a communication discovery message may be broadcast in a form of a probe request frame.

Figure 5A:
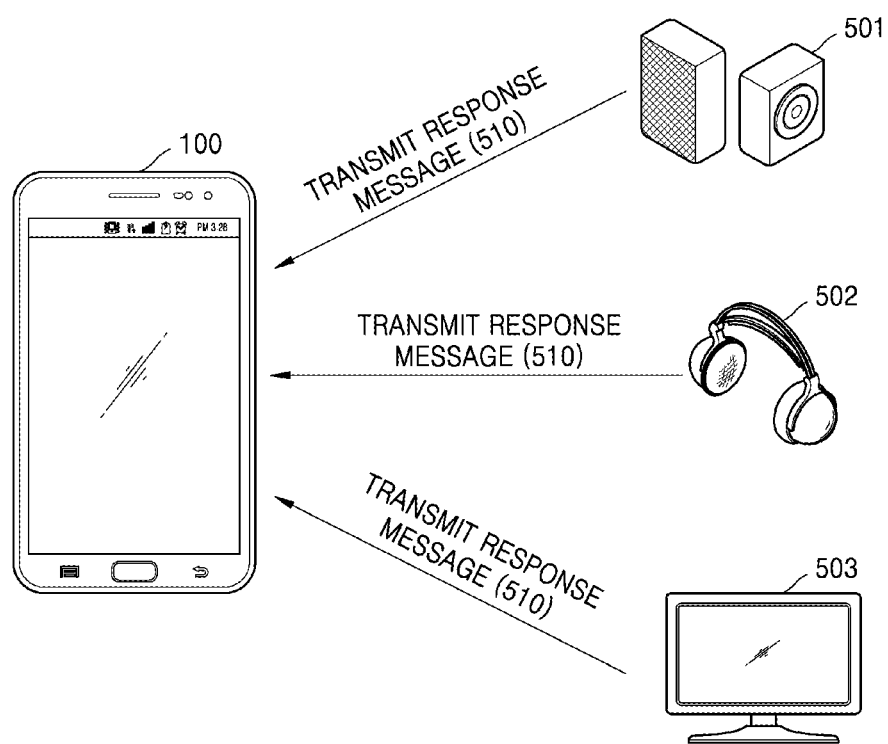
FIGS. 5A and 5B are diagrams illustrating an example process of transmitting a response message according to an example embodiment.
Figure 5B:
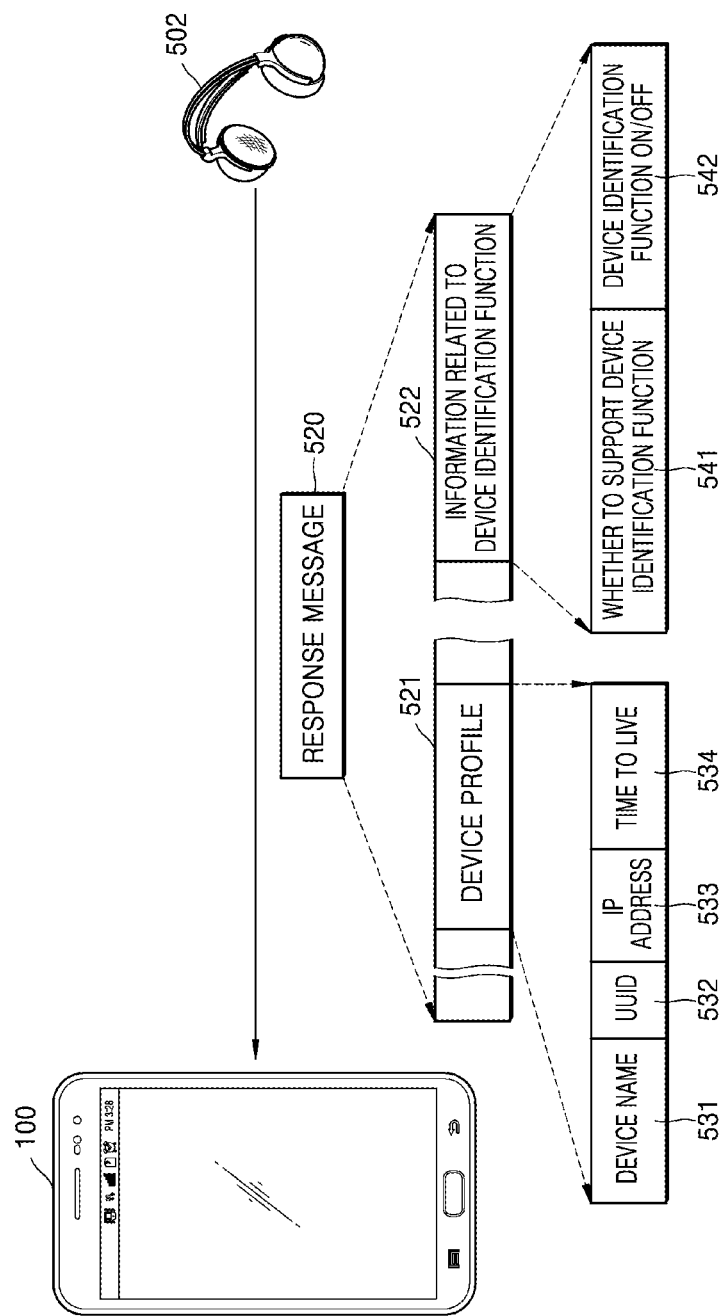

FIGS. 5A and 5B are diagrams illustrating an example process of transmitting a response message according to an example embodiment.

Referring to FIG. 5A, the communication device 100 may receive the response message from one or more external devices 501, 502, and 503 that have received a discovery message.

The one or more external devices 501, 520, and 503 that transmitted the response message may refer to external devices that may be connected to the communication device 100. The one or more external devices 501, 502, and 503 connectable to the communication device 100 may transmit the response message using a protocol that the communication device 100 used to transmit the discovery message. For example, when the communication device 100 transmits the discovery message using an mDNS protocol, the one or more external devices 501, 502, and 503 that received the discovery message may transmit the response message to the communication device 100 using the mDNS protocol. In another embodiment, when the communication device 100 broadcasts the discovery message using a Wi-Fi protocol, the one or more external devices 501, 502, and 503 receiving the discovery message may transmit the response message to the communication device 100 using Wi-Fi.

The one or more external devices 501, 502, and 503 that may be connected to the communication device 100 may transmit the response message including information indicating whether or not there is a device identification function. For example, the response message may include information indicating at least one of whether the external device transmitting the response message provides the device identification function and ON/OFF states of the device identification function.

For example, referring to FIG. 5A, the first external device 501 and the second external device 502 may provide the device identification function and may be set to the ON state with respect to the device identification function. Then, the third external device 503 may provide the device identification function but may be set to the OFF state with respect to the device identification function. As illustrated in FIG. 5A, the third external device 503 may be a TV, and others may be watching predetermined content using the third external device 503. At this time, the third external device 503 may disable the device identification function for the third external device 503 by setting the device identification function to the OFF state. Accordingly, the communication device 100 may identify an external device that may use the device identification function, based on the response message received from the one or more external devices 501, 502, and 503.

Referring to FIG. 5B, the external device 502 may send a response message 520 to the communication device 100. At this time, a form of the response message 520 may vary depending on a type of a protocol used. For example, when the response message 520 is transmitted using the mDNS protocol, the external device 502 may transmit the response message 520 in a form of a DNS packet. As another example, when the response message 520 is transmitted using an SSDP protocol, the external device 502 may transmit the response message 520 in a form of an HTTP packet. However, the type of the protocol used and the form of the response message 520 may vary according to an embodiment and are not limited to the above-described examples.

The response message 520 may include a profile 521 of the external device 502 and information 522 indicating whether there is the device identification function. For example, referring to FIG. 5B, the profile 521 of the external device 502 may include at least one of a name 531 of the external device 502, a UUID 532 of the external device 502, an IP address 533 of the external device 502, and a TTL 534.

The name 531 of the external device 502 may be set by a manufacturer in an initial process and may be changed by the user. For example, as illustrated in FIG. 5B, when the external device 502 is a Bluetooth headset, the name 531 of the external device 502 may be set to a "Bluetooth headset" by the manufacturer in the initial process.

The UUID 532 of the external device 502 means a unique identifier capable of distinguishing each external device and may vary according to an embodiment. For example, a MAC address of the external device 502 may be set to the UUID 532, or an IP address of the external device 502 may be set to the UUID 532.

The TTL 534 of the external device 502 is information indicating a time when the response message transmitted by the external device 502 is valid.

The information 522 indicating whether or not there is the device identification function may include at least one of whether or not the device identification function is provided 541 and information 542 indicating the ON/OFF state of the device identification function. For example, when the external device 502 transmits the response message 520 using the mDNS or SSDP protocol, the information 522 indicating whether or not there is the device identification function may be included in an extension field of a data packet constituting the response message 520. The mDNS or SSDP protocol may add a necessary field according to an embodiment. The extension field may mean a field added as needed. Accordingly, when the external device 502 transmits the response message 520, the external device 502 may add a field for including information indicating whether or not there is the device identification function to the data packet constituting the response message 520.

Whether or not the device identification function is provided 541 may be expressed by a value of "True" or "False". If a value is "True", the external device 502 may be a device providing the device identification function. Alternatively, when the value is "False", the external device 502 may be a device that does not provide the device identification function.

Alternatively, according to an example embodiment, if the external device 502 does not provide the device identification function, the field including the information indicating whether or not the external device 502 provides the device identification function may not be in the response message 520. At this time, the communication device 100 may determine that there is no field including the information indicating whether or not the external device 502 provides the device identification function, and thus it may be seen that the external device 502 transmitting the response message 520 provides the device identification function.

The information 542 indicating the ON/OFF state of the device identification function may be represented by a value of "ON" or "OFF". As described above, when the external device 502 is being used by another person, the external device 502 may set the device identification function to the OFF state. Accordingly, the communication device 100 may recognize an external device that may use the device identification function by using the information indicating the ON/OFF state of the device identification function in the received response message.

Figure 6:
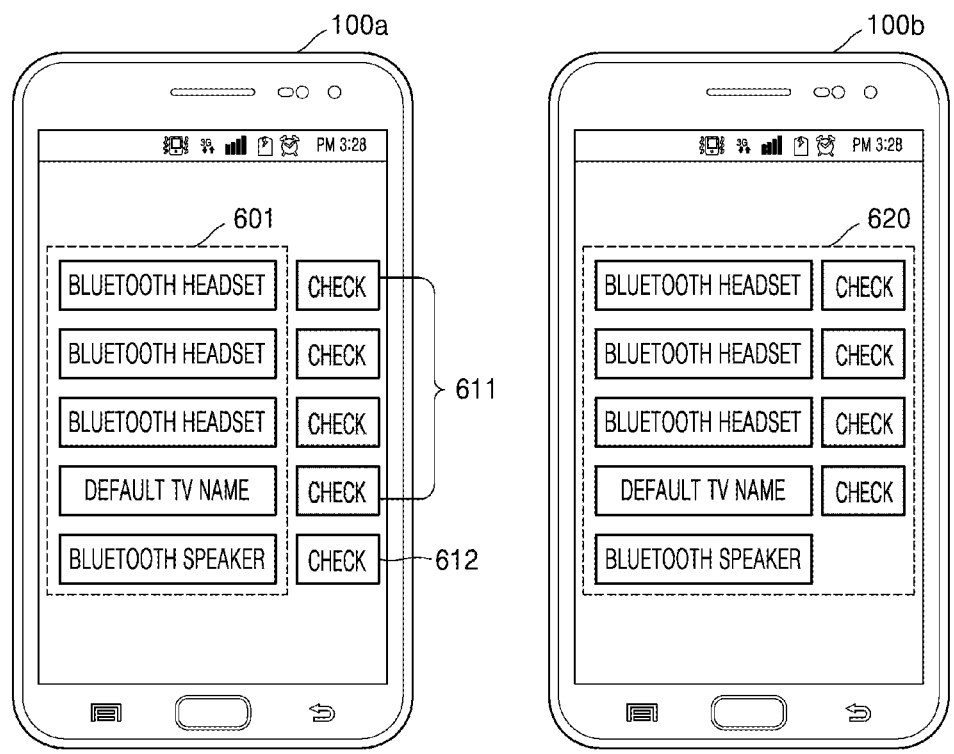
FIG. 6 is a diagram illustrating an example user interface according to an example embodiment.

FIG. 6 is a diagram illustrating an example user interface according to an example embodiment.

Based on a received response message, the communication device 100 may display the user interface required to use a device identification function.

Referring to FIG. 6, the user interface may include a list 601 of one or more external devices that transmitted the response message. At this time, the external devices included in the list 601 may include external devices that may be currently connected to a communication device 100a, and may include devices that do not provide the device identification function or devices whose device identification function is set to an OFF state.

Further, the communication device 100a may display differently an external device that may use the device identification function among the external devices included in the list 601. Referring to FIG. 6, a "Bluetooth headset" located first in the list 601 through a "default TV name" located fourth are external devices that may use the device identification function. Accordingly, the communication device 100a may display a check button 611 so that a user may select one of the external devices that may use the device identification function. However, a "Bluetooth Speaker" located last in the list 601 may be a device that does not provide the device identification function or sets the device identification function to the OFF state. Accordingly, the communication device 100a may display the check button 612 in an inactive state with respect to the "Bluetooth Speaker" located last in the list 601.

As another example, referring to a user interface 620 illustrated on the right of FIG. 6, a communication device 100b may not display a check button for an external device that may not use the device identification function. A display method in which a user may select an external device that may use the device identification function may vary depending on an embodiment and is not limited to the above-described example.

Figure 7A:
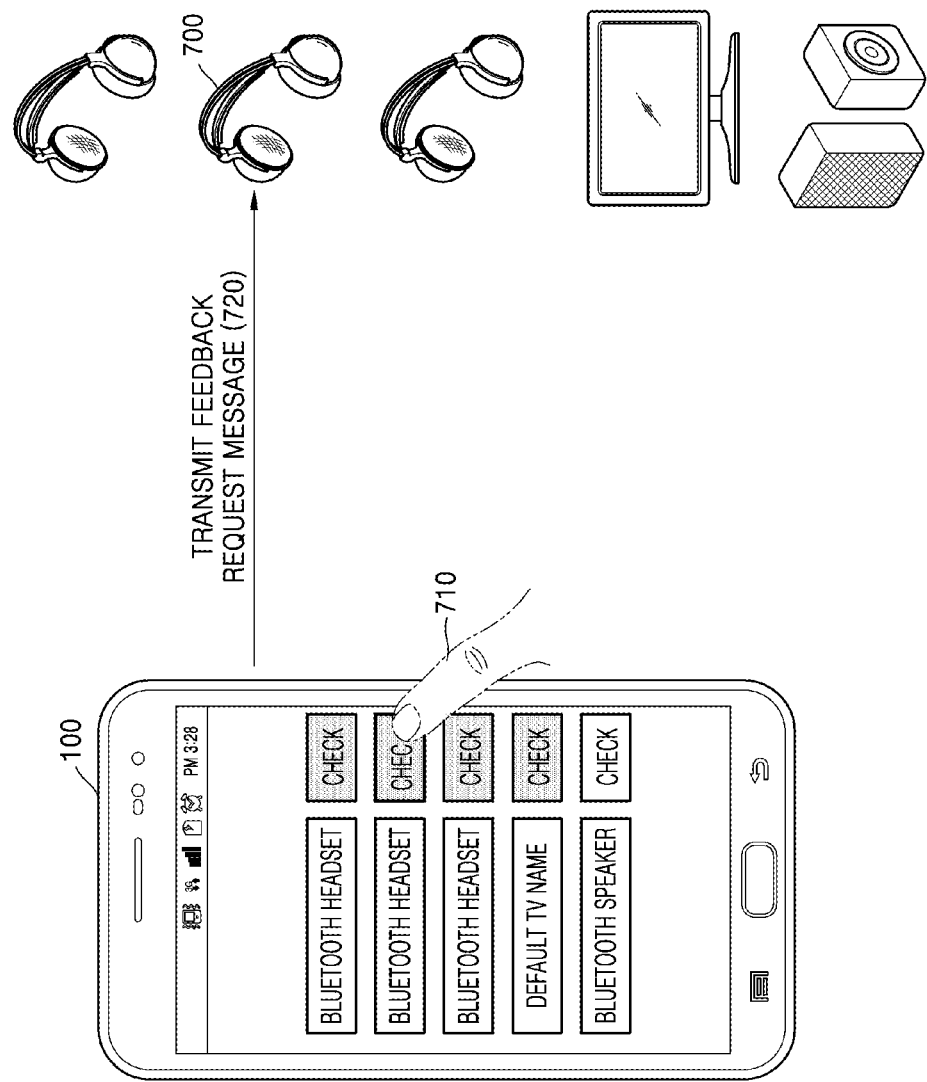
FIGS. 7A, 7B and 7C are diagrams illustrating an example process of transmitting a feedback request message according to an example embodiment.
Figure 7B:
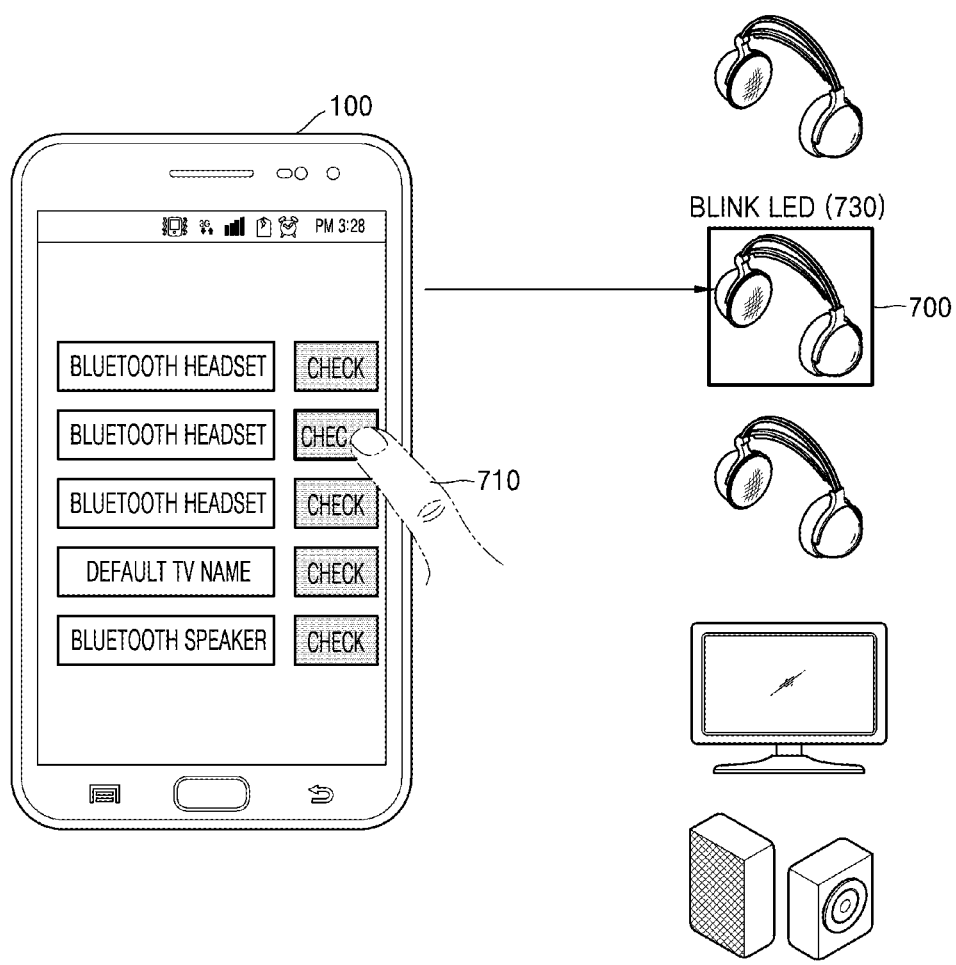
Figure 7C:
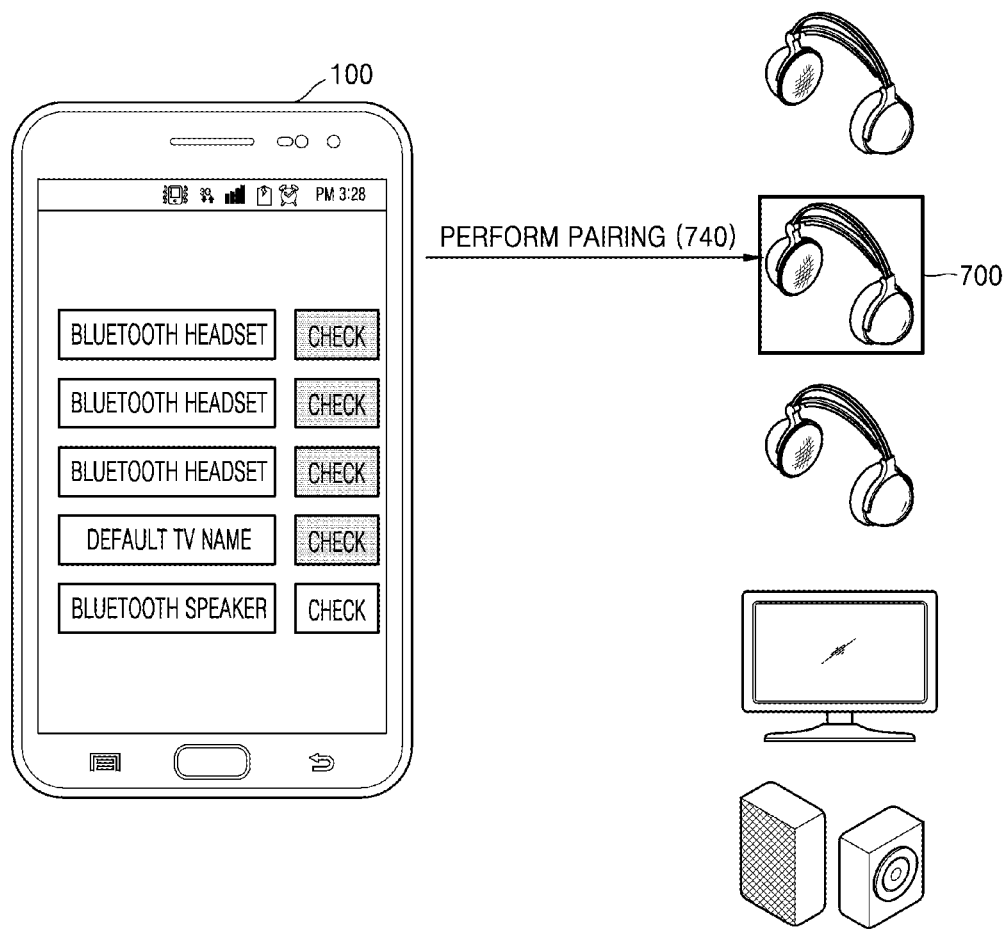

FIGS. 7A, 7B and 7C are diagrams illustrating an example process of transmitting a feedback request message according to an example embodiment.

Referring to FIG. 7A, the communication device 100 may receive a user input 710 that selects one of one or more external devices that may use a device identification function. For example, the user input 710 may be an input for touching a button for selecting one external device that may use the device identification function from a list, as illustrated in FIG. 7A, but is not limited thereto.

As illustrated in FIG. 7A, when a user input for selecting a "Bluetooth headset" is received from the list, the communication device 100 may send the feedback request message 720 to the external device 700 corresponding to the selected "Bluetooth headset". The feedback request message may mean a message for controlling an external device 700 to perform an operation indicating that the external device 700 is selected according to a user input.

When a discovery message transmitted from the communication device 100 and a response message transmitted from an external device are transmitted according to a discovery protocol such as mDNS or SSDP, the feedback request message may be transmitted by using a protocol such as a Simple Object Access Protocol (SOAP) or a Constrained Application Protocol (CoAP). A discovery protocol such as mDNS or DDSP is a protocol used to search for devices existing on the same network. When an external device connectable to the communication device 100 is found using the discovery protocol, the communication device 100 may know an IP address of the external device based on the response message received from the found external device. Therefore, after the external device connectable to the communication device 100 is found, the communication device 100 may communicate with the external device using the IP address. Accordingly, when the communication device 100 transmits the feedback request message to one external device selected from the list, the communication device 100 may use the protocol such as SOAP or CoAP.

As another example, when the discovery message transmitted by the communication device 100 and the response message transmitted from an external device are transmitted using Wi-Fi, the feedback request message may be transmitted using Wi-Fi to the external device selected from the list. For example, the discovery message may be broadcast in form of a probe request frame. The external device receiving the discovery message may transmit the response message to the communication device 100 using a MAC address or a SSID (Service Set Identifier) of the communication device 100 included in the discovery message. The communication device 100 may check the MAC address or the SSID of the external device from the response message received from the external device. Then, the communication device 100 may transmit the feedback request message to the external device selected from the list using the MAC address or SSID of the external device.

When the communication device 100 transmits the feedback request message 720 to the external device 700 corresponding to the "Bluetooth headset" selected from the list, the external device 700 receiving the feedback request message may perform an operation indicating that the external device 700 is a selected device. For example, as illustrated in FIG. 7B, when the external device 700 receiving the feedback request message is a Bluetooth headset, the external device 700 may perform an operation 730 of blinking an attached LED to indicate that the external device 700 is the selected device.

By checking that the LED is blinking in the external device 700, the user may know which device is a second external device located in the list. Accordingly, the user may confirm in advance whether the external device selected from the list is an external device to be connected to the communication device 100 before the communication device 100 performs a pairing operation.

The communication device 100 may perform the pairing operation with an external device when it is determined that the external device that performed the operation indicating that the external device is the selected device by receiving the feedback request message is the external device to be connected to the communication device 100. Referring to FIG. 7C, the user may check that the external device 700 receiving the feedback request message performs the operation of blinking the LED. If it is determined that the external device 700 that performed the operation of blinking the LED is the external device to be connected to the communication device 100, the communication device 100 may perform pairing 740 with the external device 700 that performed the operation of blinking the LED.

However, if the external device that performed the operation indicating that the external device is the selected device does not match the external device that the user wants to connect to the communication device 100, the communication device 100 may use the device identification function with respect to another external device.

Figure 8A:
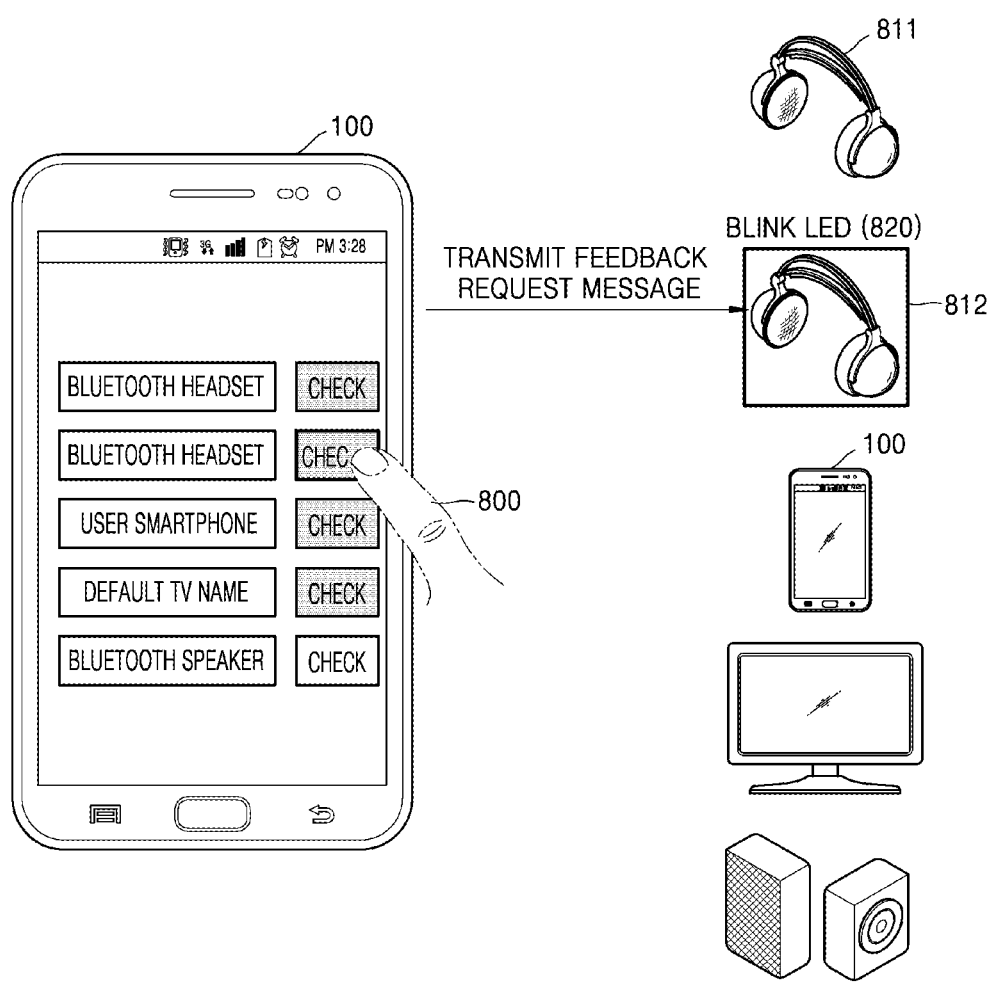
FIGS. 8A, 8B and 8C are diagrams illustrating an example operation of identifying an external device according to an example embodiment.
Figure 8B:
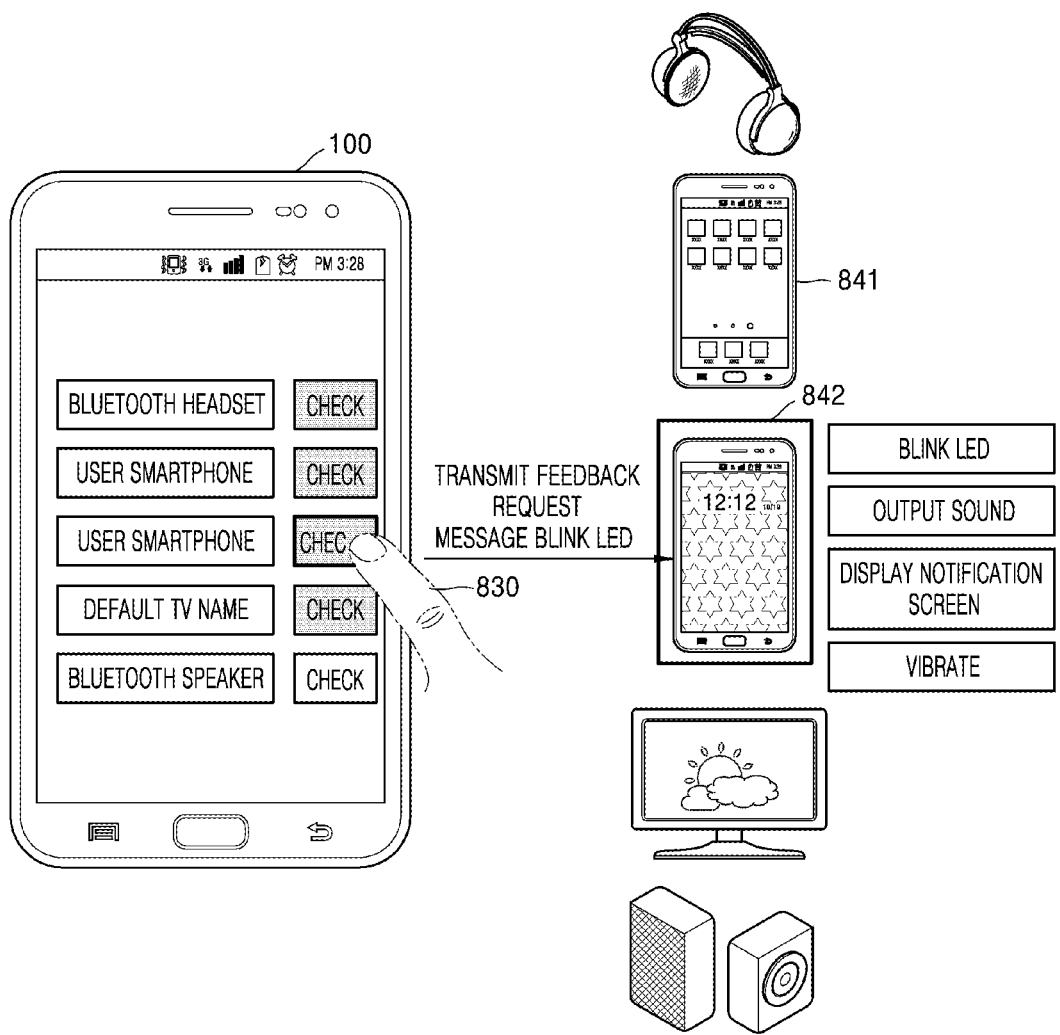
Figure 8C:
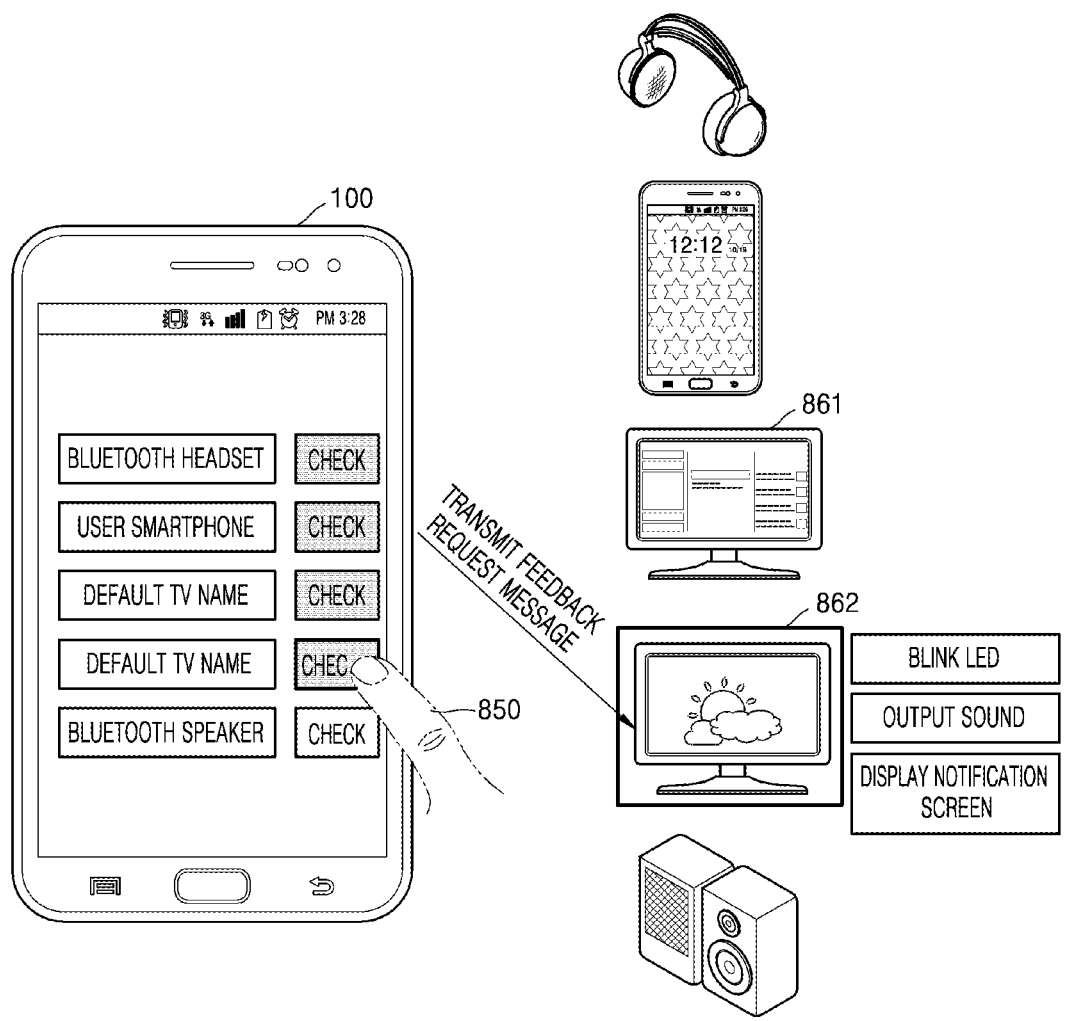

FIGS. 8A, 8B and 8C are diagrams illustrating an example operation of identifying an external device according to an example embodiment.

The external device that received a feedback request message from the communication device 100 may perform an operation of identifying the external device to indicate that the external device is a selected device.

The operation of identifying the external device may vary depending on a type of the external device and a specification of the external device. For example, referring to FIG. 8A, when a user input 800 for selecting a "Bluetooth headset" from a list is received, the communication device 100 may send the feedback request message to an external device 812 corresponding to the selected "Bluetooth headset". As illustrated in FIG. 8A, if the external device 812 corresponding to the selected "Bluetooth headset" is a Bluetooth headset, the Bluetooth headset may perform an operation 820 of blinking an LED to indicate that the Bluetooth headset is the selected device.

When the external device to which the user wants to connect to the communication device 100 is the Bluetooth headset, a plurality of Bluetooth headsets 811 and 812 may be connected to the communication device 100 as illustrated in FIG. 8A. In this case, it may be difficult to know whether the Bluetooth headset selected from the two Bluetooth headsets 811 and 812 existing in the list is the Bluetooth headset to be connected to the communication device 100. In addition, it may take a long time for the communication device 100 to perform a pairing operation with the selected external device. Thus, by using the device identification function, the user may know that the Bluetooth headset selected from the list is the Bluetooth headset to which the communication device 100 wants to connect before the communication device 100 performs pairing, thereby reducing an unnecessary operation performed in the communication device 100.

As another example, as illustrated in FIG. 8B, when a user input 830 for selecting a "User Smartphone" from a list is received, the communication device 100 may send the feedback request message to an external device 842 corresponding to the "User Smartphone". As illustrated in FIG. 8B, when the external device 842 receiving the feedback request message is a mobile phone, the external device 842 may perform at least one of operations of blinking a LED, outputting sound, and displaying a notification screen, and vibrating in order to indicate that the external device 842 is a selected device. In the case of an external device including a display such as a mobile phone, the external device may be indicated as being the selected device by performing various operations other than those of the Bluetooth headset.

As another example, when a user input 850 for selecting one "Default TV name" from the list is received, as illustrated in FIG. 8C, the communication device 100 may transmit the feedback request message to an external device 862 corresponding to the selected "Default TV name". As illustrated in FIG. 8C, if the external device 862 receiving the feedback request message is a TV, the external device 862 may select at least one of operations of blinking a LED, outputting sound, and displaying a notification screen to indicate that the external device 862 is the selected device.

Figure 9:
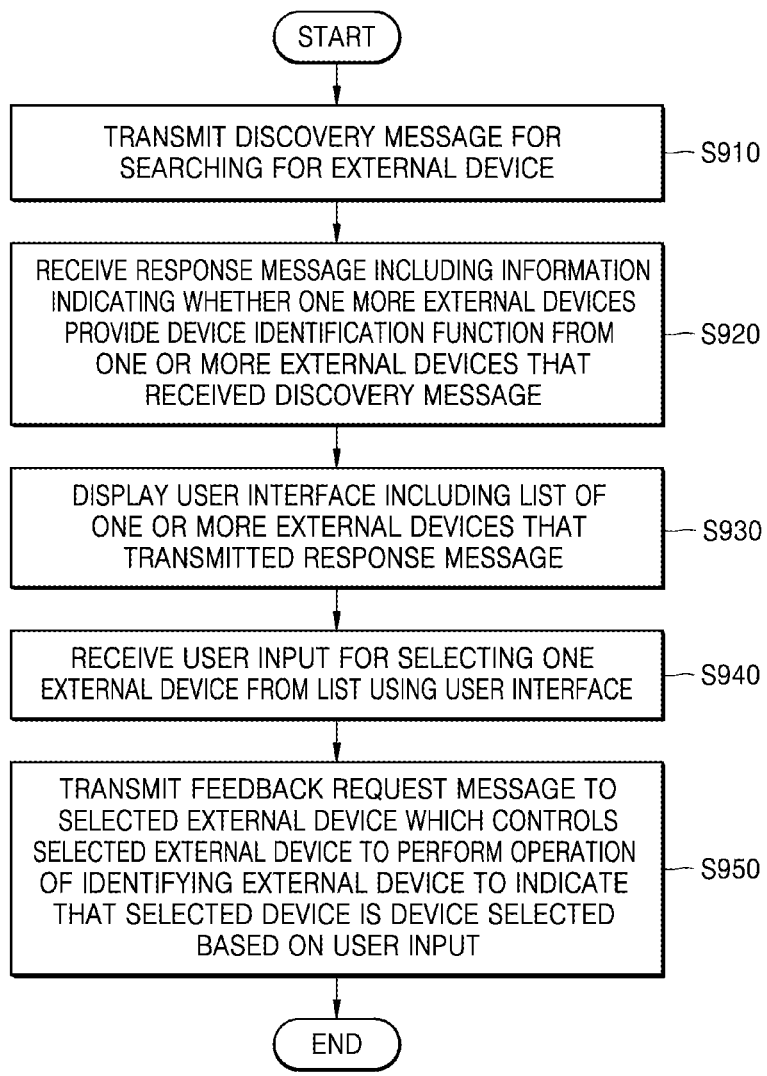
FIG. 9 is a flowchart illustrating an example communication method according to an example embodiment.

FIG. 9 is a flowchart illustrating an example communication method according to an example embodiment.

In step S910, the communication device 100 may transmit a discovery message for searching for an external device.

For example, the communication device 100 may transmit the discovery message using a discovery protocol such as a multicast Domain Name System (mDNS) or a Simple Service Discovery Protocol (SSDP). Or, according to an embodiment, the communication device 100 may broadcast the discovery message using a communication protocol such as Wi-Fi or Bluetooth.

In step S920, the communication device 100 may receive a response message including information indicating whether or not there is a device identification function from one or more external devices that received the discovery message.

The response message may include a name of an external device, a universal unique identifier (UUID), Time To Live (TTL), and information indicating whether to have the device identification function. The UUID may mean a unique identifier that may distinguish each external device. For example, a MAC address or an IP address of each external device may be set as the UUID of each external device. However, the UUID may vary depending on an embodiment, and is not limited to the above-described example. TTL is information indicating a time when a response message transmitted from an external device is valid.

In step S930, the communication device 100 may display a user interface including a list of the one or more external devices that transmitted the response message.

The user interface may include a user interface required for a user to use a function of identifying an external device. For example, the communication device 100 may display differently an external device that may use the device identification function among one or more external devices that transmitted the response message. Thus, the user may easily know the external device that may use the device identification function. The user interface may include a user interface for selecting an external device to be determined that may use the device identification function among one or more external devices.

In step S940, the communication device 100 may receive a user input for selecting one external device providing the device identification function from the list using the user interface.

For example, the user input may be an input that touches a button for selecting one external device that may use the device identification function from the list but is not limited thereto.

In step S950, the communication device 100 may transmit a feedback request message to the selected external device which controls the selected external device to perform an operation of identifying the external device to indicate that the selected device is a device selected according to a user input.

When the communication device 100 transmits the feedback request message to the external device selected from the list, the external device receiving the feedback request message may perform an operation indicating that the external device is the selected device. For example, if the external device that received the feedback request message is a TV, the external device may indicate that the external device is the selected device by performing at least one of operations of blinking a LED, outputting sound, and displaying a notification screen. As another example, if the external device that received the feedback request message is a speaker, the external device may perform an operation of outputting a predetermined sound to indicate that the external device is the selected device. However, the operation indicating that the external device is the selected device may vary depending on a type of the external device and a specification of the external device and is not limited to the example described above.

The embodiments may be implemented with instructions stored on a computer-readable storage medium in form of a programming module. When the instruction is executed by one or more processors, the one or more processors may perform a function corresponding to the instruction. A computer-readable storage medium may be a memory.

At least a part of the programming module may be implemented by a processor. At least some of the programming modules may include modules, programs, routines, sets of instructions, or processes for performing one or more functions. The computer-readable medium may include program instructions, data files, data structures, and the like, alone or in combination. The program instructions recorded on the computer readable medium may be those specially designed and constructed for the present disclosure or may be available to those skilled in the art of computer software. Examples of computer-readable media include magnetic media such as hard disks, floppy disks, and magnetic tape; optical media such as CD-ROMs and DVDs; magnetic media such as floppy disks; magneto-optical media, and hardware devices specifically configured to store and execute program instructions such as ROM, RAM, flash memory, and the like. Examples of program instructions include machine language code such as those generated by a compiler, as well as high-level language code that may be executed by a computer using an interpreter or the like.

It will be understood by those skilled in the art that the foregoing description of the present disclosure is for illustrative purposes only and that those skilled in the art may easily understand that various changes and modifications may be made without departing from the spirit or essential characteristics of the present disclosure. Therefore, it should be understood that the above-described embodiments are illustrative in all aspects and not restrictive. For example, each component described as a single entity may be distributed and implemented, and components described as being distributed may also be implemented in a combined form.

The scope of the present disclosure is defined by the appended claims and their equivalents rather than the detailed description, and all changes or modifications derived from the meaning and scope of the claims and their equivalents are to be understood as being included within the scope of the present disclosure.

What is claimed is:

1. A communication device comprising:
a communicator comprising communication circuitry;

a display; and a processor configured to:

control the communicator to transmit a discovery message for searching for an external device, control the communicator to receive a response message from one or more external devices, in response to the discovery message, the response message comprising first information indicating that a corresponding external device that sent the response message supports a function to perform a feedback operation to be identified to a user, and second information indicating an operation state of the function in the corresponding external device indicating whether the corresponding external device is currently available for the function to perform the feedback operation, control the display to display a user interface comprising a list of the external devices that transmitted the response message, wherein in the list, the external devices are respectively displayed in a first state and a second state according to the first information and the second information included in the response message, the first state indicating that the corresponding external device supports the function to perform the feedback operation and is currently available for the function to perform the feedback operation, and the second state indicating that the corresponding external device supports the function to perform the feedback operation and the corresponding external device is not currently available for the function to perform the feedback operation, and in response to a user input for selecting one external device displayed in the first state, from the list, control the communicator to transmit, to the selected external device, a feedback request message configured to cause the selected external device to perform the feedback operation of identifying the external device to inform the user that the external device for performing the feedback operation is the external device which is selected by the user input.

2. The communication device of claim 1, wherein the feedback operation comprises at least one of operations of: blinking a light emitting diode (LED), outputting sound, outputting a notification screen, and vibrating.

3. The communication device of claim 1, wherein the processor is configured to control the communicator to perform pairing with the external device when it is determined that the external device that received the feedback request message performs the feedback operation.

4. The communication device of claim 1, wherein the discovery message is transmitted through one protocol from among a multicast domain name service (mDNS), a simple service discovery protocol (SSDP), Wi-Fi, and Bluetooth.

5. The communication device of claim 1, wherein the information indicating whether the external device is available to be identified to the user is included in an extension field of a data packet comprising the response message.

6. A communication method comprising:

transmitting a discovery message for searching for an external device;

receiving, from one more external devices in response to the discovery message, a response message comprising first information indicating that a corresponding external device that sent the response message supports a function to perform a feedback operation to be identified to a user, and second information indicating an operation state of the function in the corresponding external device indicating whether the corresponding external device is currently available for the function to perform the feedback operation;

displaying a user interface comprising a list of the external devices that transmitted the response message, wherein in the list, the external devices are respectively displayed in a first state and a second state according to the first information and the second information included in the response message, the first state indicating that the corresponding external device supports the function to perform the feedback operation and is currently available for the function to perform the feedback operation, and the second state indicating that the corresponding external device supports the function to perform the feedback operation and the corresponding external device is not currently available for the function to perform the feedback operation, and in response to a user input for selecting one external device displayed in the first state, from the list, transmitting, to the selected external device, a feedback request message which is configured to cause the selected external device to perform the feedback operation of identifying the external device to inform the user that the external device performing the feedback operation is the external device which is selected by the user input.

7. The communication method of claim 6, wherein the feedback operation of identifying the external device comprises at least one of operations of: blinking an LED, outputting sound, outputting a notification screen, and vibrating.

8. The communication method of claim 6, further comprising: performing pairing with the external device when it is determined that the external device that received the feedback request message performs the feedback operation.

9. The communication method of claim 6, wherein the discovery message is transmitted through one protocol from among a multicast domain name service (mDNS), a simple service discovery protocol (SSDP), Wi-Fi, and Bluetooth.

10. The communication method of claim 6, wherein the information indicating whether the external device is available to be identified to the user included in an extension field of a data packet comprising the response message.

11. A non-transitory computer-readable recording medium having recorded thereon a program for performing the communication method of claim 6, on a computer.

* * * * *